United States Patent [19]
Hutchison, Jr.

[11] 3,724,283
[45] Apr. 3, 1973

[54] DEVICE FOR CONVERTING LINEAR MOTION TO ROTATIONAL MOTION

[75] Inventor: Miller R. Hutchison, Jr., Nantucket, Mass.

[73] Assignee: Eastman Kodak Company, Rochester, N.Y.

[22] Filed: July 26, 1971

[21] Appl. No.: 166,169

[52] U.S. Cl. ........................................74/99, 267/97
[51] Int. Cl. ................................................F16h 21/44
[58] Field of Search............74/99, 52, 521; 73/141 A; 235/70 R; 267/97

[56] References Cited

UNITED STATES PATENTS

| | | |
|---|---|---|
| 1,764,967 | 6/1930 | McElroy ..............................267/97 |
| 2,285,722 | 6/1942 | Kells et al. ..............................235/70 |
| 2,962,893 | 12/1960 | Ormond ............................73/141 A |
| 3,015,951 | 1/1962 | Ochs, Jr. ............................73/141 A |
| 3,112,135 | 11/1963 | Salomonson ............................74/521 |
| 3,636,766 | 1/1972 | Austin ....................................73/228 |

Primary Examiner—Charles J. Myhre
Assistant Examiner—Wesley S. Ratliff, Jr.
Attorney—W. H. J. Kline et al.

[57] ABSTRACT

A mechanical device for converting linear motion to rotational motion includes a strip of flexible material formed in a generally Z-shaped configuration in which the sections of the strip near the apexes of the Z remain tangentially oriented during linear motion of the end sections, thereby producing rotational movement of the central section.

3 Claims, 12 Drawing Figures

PATENTED APR 3 1973 3,724,283

MILLER R. HUTCHISON, JR.
INVENTOR.

BY Milton S. Sales

W. H. J. Kline
ATTORNEYS

FIG. 9
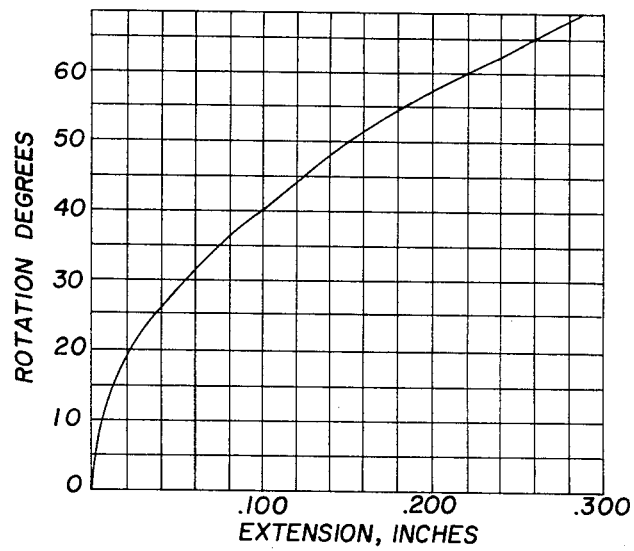
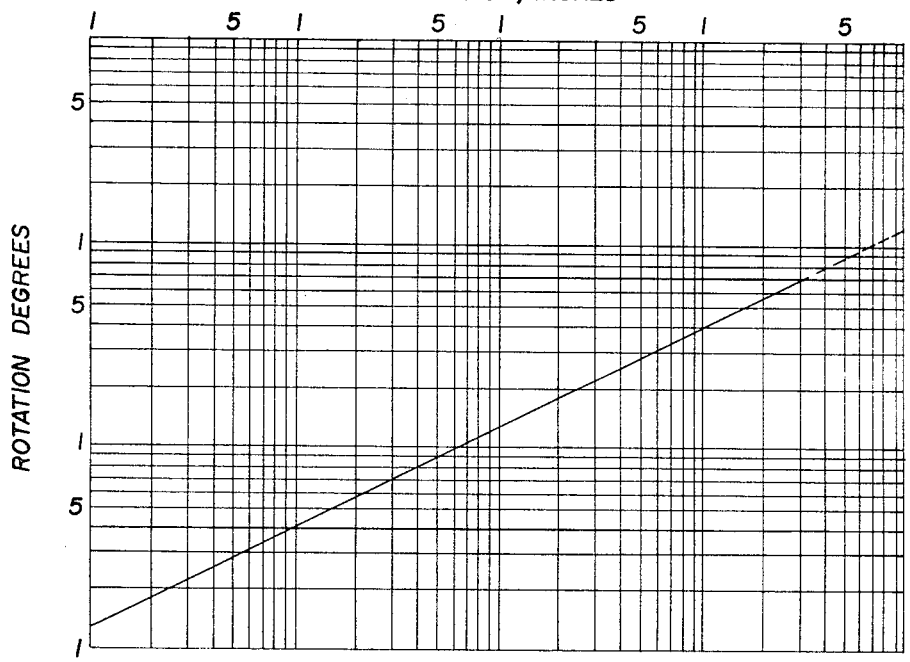
FIG. 10
MILLER R. HUTCHISON, JR.
INVENTOR.

MILLER R. HUTCHISON, JR.
INVENTOR.

BY Milton S. Salles

W. H. J. Kline
ATTORNEYS

DEVICE FOR CONVERTING LINEAR MOTION TO ROTATIONAL MOTION

BACKGROUND OF THE INVENTION

1. Field of the Invention

This invention relates to a device for transforming linear motion to rotational motion.

2. Description of the Prior Art

Motion transducers which transform linear motion to rotational motion have long been known in the art. One advantage of such transducers is that, when used in gauges, a larger scale range can be provided in the same or a smaller area if the readout is rotary rather than linear. One such device is the well-known rack and pinion mechanism which transforms linear motion of the rack to rotary motion of the pinion. A needle or pointer can be mounted on the pinion shaft to be rotated above a scale. While such devices are suitable for low accuracy work, the lost motion and frictional losses prevent their use in high accuracy instruments.

Another type of known transducer is shown in an article entitled "The Measurement of Moisture Movements in Building Materials" by F. L. Barrow, beginning on page 475 of the *Journal of Scientific Instruments*, Vol. 4, 1927. In this article, a block carrying a readout device is held between two flexible strips of steel, one of which being connected to a support and the other to a linearly movable specimen. The steel strips are offset from one another in a direction transverse to the direction of movement of the specimen. When the specimen moves towards the support, the steel strips buckle and rotate the readout device supporting block. While such a device is more accurate than the above-described rack and pinion, the relation between the amount of movement of the block and the linear displacement of the specimen is not analog and the device would not be suitable for tension loading.

SUMMARY OF THE INVENTION

It is an object of the present invention to provide a mechanical device capable of transforming linear motion to rotational motion having a logarithmic relationship to the linear motion.

It is another object to provide a unitary mechanism in which elongation of the mechanism is converted into logarithmic angular movement.

In accordance with the preferred embodiment of the invention, a device is formed of flexible strip material formed in a generally Z-configuration. The legs of the Z are movably mounted to follow the linear motion of the specimen and are joined by a body member. The portions of the legs adjacent the apexes of the Z are constrained to remain generally tangent to the adjacent portions of the body member as the legs are extended.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 9 is a graph showing the relation between linear input to rotational output of the device;

FIG. 10 is another graph showing the relation of FIG. 9 on a log-log scale;

DESCRIPTION OF THE PREFERRED EMBODIMENTS

The illustrated embodiments of the present invention include a device for converting linear motion to rotational motion that comprises a unitary structure formed either by bending a single strip of stainless spring steel or other suitable material or by joining three separate flat strips of such material into a flattened, Z-shaped configuration. The structure formed in this manner is capable of converting the linear motion of the ends of the device being stretched apart to rotational motion of the center section or body member. The angle of rotation of the center section is a function of the displacement of the ends of the device and it has been shown experimentally that the function is a high order approximation to one.

Figure 1:
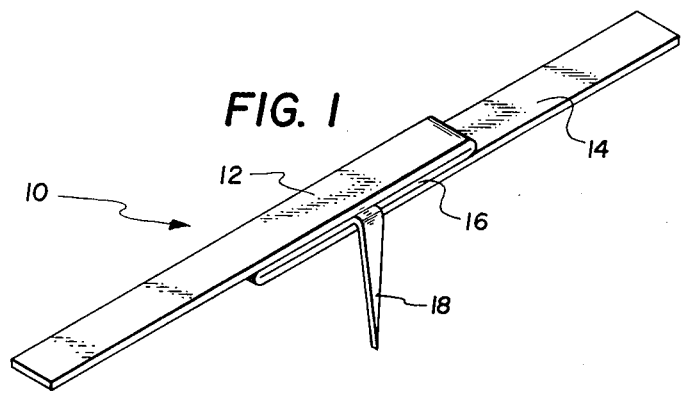
FIG. 1 is a perspective view showing one embodiment of the transducer of the present invention.
Figure 2:
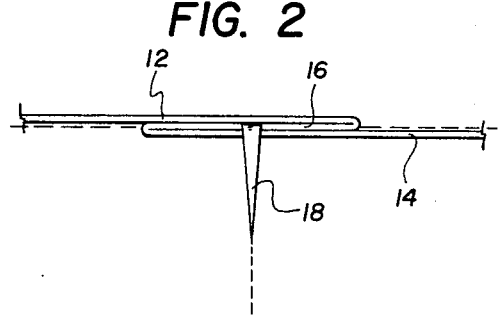
FIG. 2 is a side elevation of the transducer in its relaxed state.

FIG. 1 shows a device 10 according to the present invention which is formed of a single, homogeneous strip of metal of uniform cross section. The device is shown in its rest position. The Z-configuration is formed by bending the end sections or legs 12 and 14 of the strip flat upon the central section 16. The length of central section 16 may be varied according to the maximum extension to be applied to the strip, its length determining the angle through which it turns as end sections 12 and 14 are drawn apart. It is desirable to limit this angle to approximately 75° or less to avoid overstressing the folds, such overstressing possibly resulting in shortening the useful life of the transducer. A pointer 18 is shown attached to central section 16 as can be used in conjunction with a scale for readout purposes.

FIGS. 2, 3, 4 and 5 show progressive views of the effect of elongation of transducer 10. It will be apparent that central section 16 rotates about an axis passing transversely through its center as the transducer is elongated. When the elongation process is reversed, all parts of transducer 10 return to their initial positions with neither lost motion nor friction to be overcome within the unitary structure of the spring. In fact, tests have been conducted wherein the device was subjected to increasing and decreasing extension and no mechanical hysteresis was detected. The angle $\theta$ at the center of the middle section is related to the distance of elongation $\chi$ by the following equation:

$$\overline{\Delta \theta = K \sqrt{\Delta \chi}}$$

where $k$ is a constant. Or, in other words, the motion amplification at various extension of the transducer can be expressed by the following equation:

$$\overline{\Delta \chi}/\overline{\Delta \theta} = k/2\theta^{1/2}$$

In practice, the transducer performs with a high order of approximation to this simple relationship for attained angles as great as 90°. This fact is a consequence of the theory of elasticity as will be explained hereinafter.

THEORY

Figure 3:
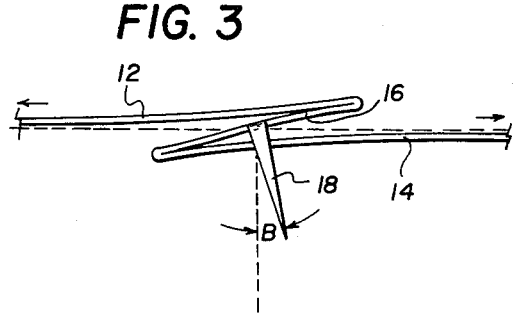
FIGS. 3–5 are side elevations of the transducer in varying states of extension.
Figure 4:
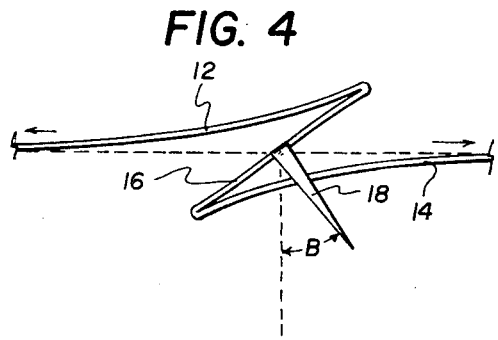
Figure 5:
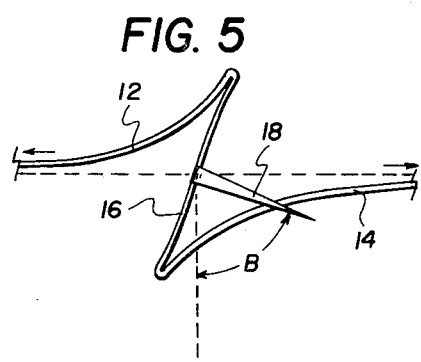

The curves which compose the shape shown in FIGS. 3–5 are portions of the set of curves obtained in solving the problem of the Elastica which was almost the first problem ever solved in the theory of elasticity and was first investigated by James Bernouilli in 1705. The problem was solved later by Euler in 1744. The solution was mathematically very intractable and has so remained to the present day. Since Kirchoff's day (1859), the problem is usually formulated as an analog of the problem of the exact motion of a pendulum and from this point of view the solution is found to depend on the elliptic function. Something like one or another of these approaches is required in order to obtain an analytic explanation of the behavior in FIGS. 3–5.

ANALYTIC APPROACH

Figure 6:
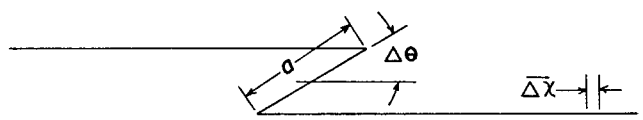
FIGS. 6–8 are views useful in developing an analytical proof.

Considering for the moment that a device is formed as shown in FIG. 6 with a configuration similar to that of FIG. 1 except that the end sections are infinite and are joined to the central section by hinges. The two outer legs remain straight and parallel during the motion while the central leg remains straight by rotation. It is easily seen that the motion is controlled by the formula:

$$\overline{\Delta \chi} = a(1 - \cos \overline{\Delta \theta})$$

where $a$ is the length of the central section. By expanding this formula in series one obtains this result:

$$\overline{\Delta \chi} = a/2\ \overline{\Delta \theta}^2 - a/24\ \overline{\Delta \theta}^4 + \ldots$$

The error term $a/24\ \Delta \theta^4 + \ldots$ is to the true law as 1 is to $\overline{\Delta \theta}^{2/12}$. Thus the percent error for this error term is:

| $\theta$ | % Error |
|---|---|
| 0° | 0 |
| 30° | 2.3 |
| 60° | 9.2 |
| 90° | 20.6 |

Figure 7:
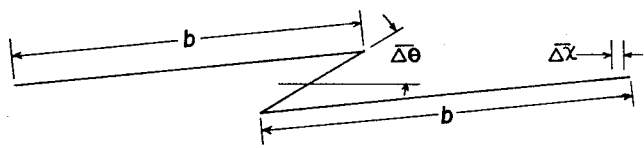

Next, suppose the infinite sides of the Z are replaced with finite ones of length $b$ as shown in FIG. 7.

Letting $c$ be the collapsed length $(2b - a)$, then one has by law of cosines:

$$b^2 = (a/2)^2 + (c+\overline{\Delta \chi}/2)^2 + [a(C+\overline{\Delta \chi})/2] \cos \overline{\Delta \theta}$$

Or upon solving for $X$:

$$\overline{\Delta \theta} = a(\Delta \theta^2/2) - a(1+3a/2b)\ \overline{\Delta \theta}^4/24 + \ldots$$

The error is larger than before in the ratio $(1 + 3a/2b : 1$.

For example, if $a$ is one-third as long as $b$, the error is 50 percent greater that when $b$ is infinitely long.

Figure 8:
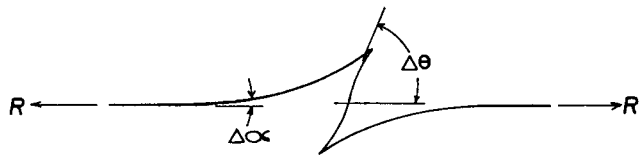

Now consider the problem when the springs are not hinged. The new configuration is as shown in FIG. 8. Each leg of this Z is a portion of an Elastica and the equations joining these curves are:

$$\sin \Delta \propto /2\ sn\ (b\ \sqrt{R/B_b} + K_b) = \sqrt{1 - \sin^2 \Delta \theta/sn}$$
$$(a/2\ \sqrt{R/B_a} + K_a),\ \text{or}$$
$$\sqrt{R/B_b} \sin \Delta \propto /2\ cn\ (b\ \sqrt{R/B_b} + K_b) = R/B_a \sin$$
$$\Delta \theta/2\ cn\ (a/2\ \sqrt{R/B_a} + K_a)$$

The change in length is given by:
$$\Delta \chi = 2\{b - a/2 - \sqrt{B_b/R}\ (-b\ \sqrt{R/B_b} + 2\ (Eam\ (b$$
$$\sqrt{R/B_b} + K_b)$$
$$-Eam\ (K_b)))\ \sqrt{B_a/R}\ (-a/2\ \sqrt{R/B_a} + 2\ (Eam\ (a/2$$
$$\sqrt{R/B_a} + K_a) - Eam\ (K_a))\}$$

where: $B_a, B_b$ are section moments of inertia,
$K_a, K_b$ are complete elliptic integrals corresponding to $\sin \Delta \propto /2$ and $\sin \theta/2$,
$sn, cn$ are elliptic functions, and
$Eam$ is an elliptic integral In theory $\Delta \propto$ and $R$ can be eliminated to yield a relationship between $\Delta \chi$ and $\Delta \theta$ with parameters $a, b, B_a$ and $B_b$, but in practice this elimination is quite difficult. However, several special cases have been solved with results given below.

Case I, Rigid Central Leg, Resilient Outer Legs
a. For $b$ infinity, $\Delta \chi = a/4\ \Delta\ \theta^2\ (1 - \Delta\ \theta^2/48 + \ldots)$
The error is but one-quarter of the error corresponding to FIG. 6.
b. For $b > 1.5a$, one has to within 5 percent:

$$\Delta \chi + a/4\ \Delta \theta^2\ (1 - 1/2.8 \cdot \Delta \theta^2/12 + \ldots)$$

The error is 1/2.8 of the error corresponding to FIG. 6.

Case II, Rigid Outer Legs, Resilient Central Leg
For $b$ equals infinity, $\Delta \chi = \theta/4\ (1 - \theta/48 + \ldots)$
The error is one-quarter of the error corresponding to FIG. 6.

GENERAL CONCLUSION

The general conclusion of this analysis is that the desired equation $\Delta \overline{\theta} = K\ \sqrt{\Delta \chi}$ is more closely satisfied by the flexure configuration than by the hinged configuration. A quantitative conclusion is that for flexures, the relation of that equation is satisfied within 1 percent for angles as great as 30°; within 2 percent for angles as great as 60°, and within 5 percent for angles as great as 90°.

FIG. 9 is a plot of experimental data for one construction showing rotation of the center of middle section 16 versus elongation of the transducer. The term equation is $\chi = 127\theta^{1/2}$. FIG. 10 is a plot of the data shown in FIG. 9 on log-log scales. It is apparent that the plot results in a straight line having a positive slope of one-half on these scales.

Figure 11:
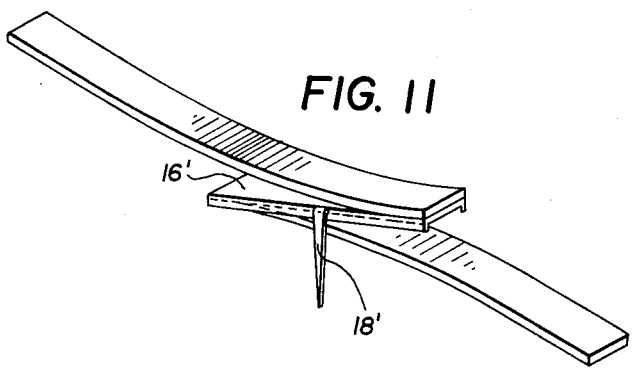
FIG. 11 is a perspective view of a second embodiment of the present invention.

FIG. 11 shows a transducer identical to that of FIG. 1 except that central section 16' has been reinforced by giving it a U-shaped cross section. In the modification shown, central section 16' is made rigid in order to support a pointer 18' or other indicator of the rotational movement of this section. As explained above, the performance characteristics are not significantly changed from those of the embodiment shown in FIGS. 1–5. In fact, the entire central section 16' may be made rigid without significant deviation from optimum performance. In such case, the angular deflection of the unit would be lessened at the same elongation, all else being the same. In terms of the fundamental equation of the transducer, only the constant $k$ would be affected, its numerical value being lower. FIG. 11 also shows the use of separate members joined at their ends rather than a one-piece mechanism.

Figure 12:
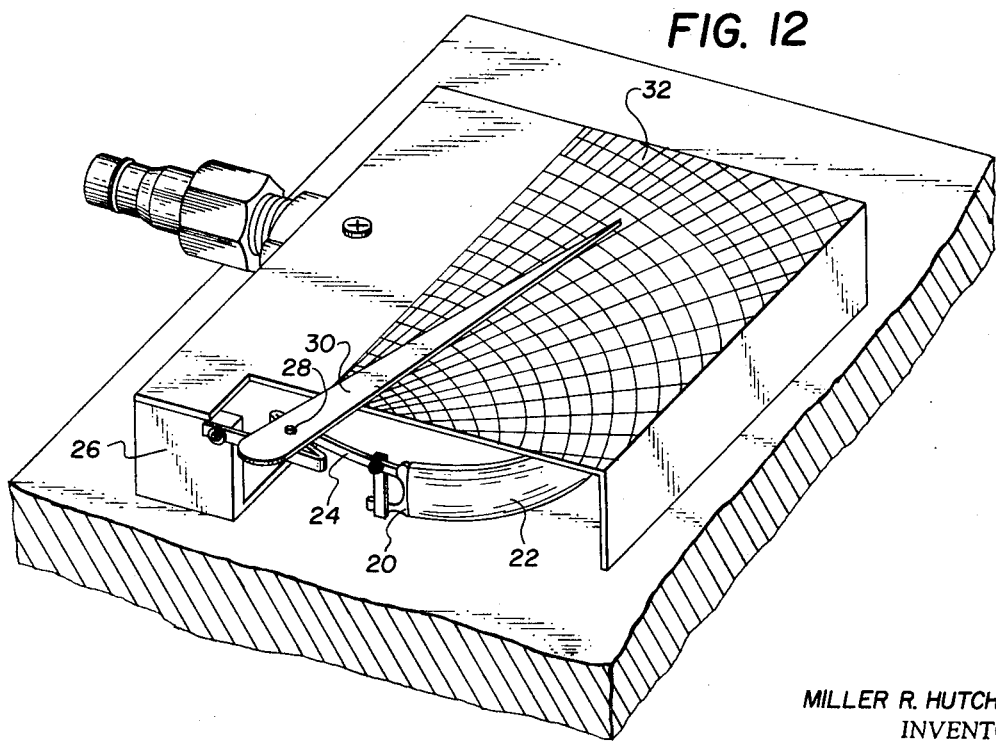
FIG. 12 shows one possible use of the transducer of the present invention.

The attributes of simplicity and low inertia of the motion transducer of the present invention recommend it for use in applications in a variety of instruments which depend upon change of length to indicate mechanical stress, fluid pressure, temperature, relative humidity, weight or force, electrical potential or current, etc. FIG. 12 is an example of the usefulness of the transducer as applied to a Bourdon tube gauge. Bourdon gauges are the most common of the spring type gauges used to indicate pressure in pounds per square inch. An example of a conventional use of such a gauge is shown in U.S. Pat. No. 2,355,688. A Bourdon tube is eliptical in cross section and is bent into a circular arc. When internal pressure is applied to such a tube, it tends to straighten out. Ordinarily, the closed free end of such a tube is connected by a link with a pivoted gear section which engages a small pinion on a pivoted shaft mounting the pointer or needle of the gauge. By this arrangement, the small motion of the tube is amplified and the pointer is made to turn through 180° or more against a scale of pressures on the instrument dial. Friction and lost motion in the connecting mechanism reduce the sensitivity of such gauges and impair their accuracy.

As shown in FIG. 12, the closed end 20 of a standard Bourdon tube 22 is attached to one end 24 of the motion transducer of the present invention while the other end of the transducer is rigidly fixed to a base 26. As Bourdon tube 22 is pressurized, the transducer is lengthened to rotate the center of the middle section about 28 as described above. By attaching a needle 30 to the middle section, the amount of elongation, and thus the pressure in the Bourdon tube, can be read out by needle movement across a scale 32.

The invention has been described in detail with particular reference to preferred embodiments thereof, but it will be understood that variations and modifications can be effected within the spirit and scope of the invention.

I claim:

1. A device for converting linear motion to rotational motion, said device comprising:
   a. a member rotatable about an axis;
   b. a strip of resilient material flexible in a plane perpendicular to said axis and having a portion movable in a linear direction in said plane; and
   c. means for connecting said strip and said member so that movement of said portion of said strip rotates said member in an amount logarithmically proportional to the amount of movement of said portion.

2. A device as defined in claim 1 wherein:
   a. said member has a surface lying in a second plane which is parallel to said axis; and
   b. said strip is connected to said member in a manner constraining said strip to remain tangent to said surface.

3. A device for converting linear motion to rotational motion, said device comprising a strip of resilient material bent upon itself twice to form a generally Z-shaped member including:
   a. first and second legs;
   b. a body member having first and second ends respectively connected to one end of each of said first and second legs by the bends, said bends being formed to constrain said one end of said legs to remain tangent to the attached end of the body member, whereby linear movement of other ends of said legs causes rotational movement of said body member.

* * * * *